United States Patent [19]

Lewis

[11] Patent Number: 5,461,108
[45] Date of Patent: Oct. 24, 1995

[54] PRESERVATION OF WOOD WITH PHENOL FORMALDEHYDE RESORCINOL RESINS

[75] Inventor: Jean Lewis, deceased, late of Worcester, Mass., by Florence C. Lewis, executrix

[73] Assignee: Polymer Wood Processors, Inc., Ambler, Pa.

[21] Appl. No.: 113,651

[22] Filed: Aug. 31, 1993

[51] Int. Cl.⁶ .................................................... C08L 61/06
[52] U.S. Cl. ........................ 524/596; 524/413; 524/416; 428/541
[58] Field of Search .................... 524/596, 413, 524/416; 428/541

[56] References Cited

U.S. PATENT DOCUMENTS

| | | | |
|---|---|---|---|
| 2,983,629 | 5/1961 | Anderson | 428/541 |
| 2,983,630 | 5/1961 | Anderson | 428/541 |
| 3,294,870 | 12/1966 | Grayson et al. | 524/413 |
| 3,968,276 | 7/1976 | Allen | 427/297 |
| 4,061,620 | 12/1977 | Gillern | 524/841 |
| 4,076,873 | 2/1978 | Shea | 428/34.5 |
| 4,152,320 | 5/1979 | Shapiro et al. | 524/143 |
| 4,175,065 | 11/1979 | Andersson | 524/541 |
| 4,399,195 | 8/1983 | Allen, Sr. | 428/541 |
| 4,433,031 | 2/1984 | Allen, Sr. | 428/541 |
| 4,608,408 | 8/1986 | Hood et al. | 524/15 |
| 4,670,484 | 6/1987 | Fuchs et al. | 523/205 |
| 4,818,595 | 4/1989 | Ellis | 428/245 |
| 4,824,896 | 4/1989 | Clarke et al. | 524/405 |
| 4,897,314 | 1/1990 | Clarke et al. | 428/529 |
| 5,106,697 | 4/1992 | Whittemore | 428/529 |
| 5,256,714 | 10/1993 | Liu et al. | 524/120 |

*Primary Examiner*—Paul R. Michl
*Assistant Examiner*—John J. Guarriello
*Attorney, Agent, or Firm*—Webb Ziesenheim Bruening

[57] ABSTRACT

Wood and other cellulose-based products are preserved with a water-based treating solution containing a phenolic resin prepolymer such as phenol formaldehyde resin prepolymer, a resorcinol formaldehyde resin prepolymer and water. The treatment is carried out by exposing the wood or other cellulose-based product, while submerged in the treating solution, to one or more cycles of reduced pressure (i.e. vacuum) and elevated pressure.

14 Claims, No Drawings

PRESERVATION OF WOOD WITH PHENOL FORMALDEHYDE RESORCINOL RESINS

BACKGROUND OF THE INVENTION

1. Field of the Invention

This invention relates to the preservation of wood, and includes the chemical compositions used to treat the wood, the process of treating the wood, and the treated wood that results from the process. The chemical compositions which are described herein are especially well suited for use in the method of U.S. Pat. No. 3,968,276 in which wood to be treated is exposed to a reduced pressure for the purpose of removing moisture and volatiles from the wood, and thereafter impregnating the wood with an aqueous phenol formaldehyde/resorcinol formaldehyde chemical composition as hereinafter described.

2. Description of the Prior Art

Wood is one of the oldest materials known to man. Its ready availability in most parts of the world, coupled with the ease with which it can be cut and fabricated into useful articles, makes it well suited for a variety of applications. However, because wood is a cellulosic material, it is susceptible to decay and deterioration over any extended period of time. As a result, numerous methods have been proposed for treating wood to improve its durability, particularly when used under conditions where the wood is exposed to moisture or biological attack.

Applications of wood such as its use in manufacturing railroad ties, utility poles, fence posts, and the like, have created substantial incentives for industry to develop effective and commercially practical methods of treating the wood to extend its useful life (i.e. wood preservation). Various techniques of wood preservation have been used including surface coating, surface treating and pressure penetration of the wood with a variety of chemicals such as creosote, halogenated phenols such as pentachlorophenol and the like.

When halogenated phenols such as pentachlorophenol are used to treat wooden poles (such as utility poles), it is common to dissolve the pentachlorophenol in a hydrocarbon oil, pressure treat the poles, and then evaporate the excess oil. Such a process is relatively expensive, but is justified by the wood preservative properties of the pentachlorophenol.

However, the treated poles tend to "bleed" their treating solution into the surrounding soil when the poles are installed in the ground. This draining or leaching effect is more visible on the sunny side of utility poles which drain or bleed faster because the heat from the sun warms the treating solution and reduces its viscosity.

In an effort to reduce treating costs, water is sometimes substituted for the hydrocarbon oil, and the pentachlorophenol is used in one of its salt forms to provide water solubility. However, this approach has a number of disadvantages and is less preferred than the oil treatment.

Unfortunately, most of the present treating processes (e.g. those using creosote, various copper and mercury compounds, or pentachlorophenol), even when operated under significant pressure conditions, do not result in deep impregnation of the wood. Thus, the wood being treated with any chemical is typically treated to only a shallow depth and, in the case of logs or poles, very often the degree of penetration does not extend throughout all of the soft or sapwood, much less penetrate the heartwood.

However, U.S. Pat. No. 3,968,276 discloses a method for treating wood (logs or dimensional lumber), wherein the wood is preserved by impregnating the wood with chemicals which penetrate substantially to the core or center of the wood being treated. In the case of logs or poles, this penetration can be deep within the heartwood and may be substantially complete.

U.S. Pat. No. 3,968,276 discloses enclosing the wood within a chamber, sealing the chamber, evacuating the chamber slowly so that the wood is exposed to a pressure below atmospheric pressure, introducing in to the chamber a sufficient amount of an aqueous solution of resin prepolymer to immerse the wood and then maintaining the vacuum over the immersed wood for a period of time both to allow the removal of moisture and volatiles from the wood and to permit the treating solution to enter into the wood. Thereafter, an additional amount of the resin prepolymer solution is introduced into the chamber (if needed) and the pressure on the system is increased to super atmospheric pressure to thereby cause an even deeper penetration of the treating solution into the wood. The vacuum and pressure cycle may be repeated one or more times (e.g. 1 to 30 or more cycles). When the treatment is completed to the desired extent, the treated wood is recovered from the chamber. The process described is extremely effective and achieves substantially greater penetration of the wood than any other commonly practiced treating processes.

Also it is known in the prior art, as disclosed in U.S. Pat. Nos. 4,399,195 and 4,433,031, that one or more known wood preservatives, such as the halogenated phenols, can be introduced deep into the wood being treated and obtain reduced "bleeding" or leaching, by combining the wood preservative with the method of U.S. Pat. No. 3,968,276 by using a special class of treating compositions that are water-based or water dilutable which permits the benefits of the aqueous resin prepolymer system of U.S. Pat. No. 3,968,276 to be maintained.

Further, U.S. Pat. Nos. 4,399,195 and 4,433,031 disclose that it is possible to accomplish deep penetration with reduced bleeding without encountering any significant amount of "blooming" which is normally associated with aqueous treating solutions of halogenated phenols. This blooming effect is caused by the fact that the aqueous treating solutions are made from salts of halogenated phenols, which dissolve readily in water. Because the salts are water soluble, there is a tendency for the salts to be redissolved by rain water or ground water and to migrate easily to the surface of the treated wood where they crystallize during the subsequent evaporation of the water, causing the "blooming effect".

U.S. Pat. Nos. 4,399,195 and 4,433,031 disclose manufacturing a water dilutable concentrate or a water-based treating solution which consists essentially of: (a) a halogenated phenol wood preservative such as pentachlorophenol; (b) a phenolic resin prepolymer such as phenol formaldehyde prepolymer; (c) a coupling or solubilizing agent for enhancing the water compatibility of the concentrate (e.g. methyl alcohol or acetone with or without the addition of a surfactant); and (d) water. Optionally and preferably, the disclosed treating solutions contain organo/metallic salts, especially copper or zinc salts.

In addition, U.S. Pat. Nos. 4,339,195 and 4,433,031 disclose that the ability of the prepolymer to cure rapidly and lock the halogenated phenol deep within the wood can be enhanced by heating the wood at the conclusion of the treatment (e.g. heating the wood with steam) to thereby accelerate the curing of the resin prepolymer.

The term "curing" as used in the previous paragraph is to be differentiated from the term "gelling" as used hereinafter in the present art. Curing refers to the process by which wood preservative stabilizes once impregnated into the wood. Gelling refers to the solidification or semi-solidification of the resins forming the wood preservative during preparation of the wood preservative. Gelling or, more specifically, the time it takes for gelling to occur (gel time testing) is used in the art as an indicator of resin activity and is used to predict and select curing parameters and characteristics of the resins used in the wood preservative solutions.

While the process for treating wood as disclosed in U.S. Pat. Nos. 4,399,195 and 4,433,031 works quite well, the wood treating compositions of the prior art suffer from the limitations of having a limited shelf life, relatively slow curing times and the requirement of significant amounts of heat to effect curing.

It was also known in the prior art to use water soluble phenol formaldehyde resoles as wood preservatives. Such a resole of the prior art typically gels in approximately 10 to 20 minutes at 121° C. and has a shelf life of 3 to 6 weeks at 25° C. (measured by its ability to remain infinitely water dilutable).

In the adhesive art (glues, etc., an art distinctly different from the wood preservative art), it was known that resorcinol formaldehyde resins could be added to or blended with certain water soluble phenol formaldehyde resoles which contain free formaldehyde to react with the resorcinol, wherein the resorcinol functioned to cause more rapid gelling and curing of the adhesive at room temperature. However, the resorcinol formaldehyde modified phenol formaldehyde resins of the adhesive arts were not used as wood preservatives and invariably exhibited a much shorter shelf life than non-blended resins. Further, the resorcinol modified resins of the adhesive arts were designed to fully cure at room temperature, which is not compatible with the wood preservative arts, where the resin must be retained in a liquid state for extended periods both on the shelf and during the impregnation process. While curing at room temperature after the impregnation process is complete may be compatible with the wood preservative arts, premature gelling of the resin solution at room temperature is not. Gelling of the resins in the wood preservative arts is to be avoided because a fully gelled resin cannot impregnate the wood at all, and the large molecules in a partially gelled resin cannot effectively impregnate the minute interstices of the wood and, therefore, cannot penetrate deep into the heartwood, either.

It would be preferred if the known wood preservative resins of the prior art could cure faster and at lower temperatures after impregnation than those presently known in the art, exhibit extended shelf life but without premature gelling. Also, while free or unreacted formaldehyde may be necessary with phenol formaldehyde resins of the prior art for reaction purposes, it would also be preferred if such resins would exhibit an extremely low free formaldehyde content during resin formation, during the impregnation process at the wood impregnation plant, and after the wood is cured and used in its final application, because formaldehyde is toxic and is considered an environmental hazard. Further, it would be preferred if such resins exhibited increased tolerance to the additives which are normally added to these resins to aid in wood preservation and fire retardance.

SUMMARY OF THE INVENTION

Generally, the present invention is directed to a method of preserving and fire-proofing wood utilizing specific chemical compositions. The present invention is also directed to the chemical compositions. The present invention is also directed to the process of producing the chemical compositions. Finally, the present invention is also directed to the wood preserved and fire-proofed.

More specifically, the present invention is directed to a water dilutable concentrate or a water-based wood or cellulose treating solution comprising:

a) an effective wood preserving amount of a phenolic resin prepolymer; and b) an effective amount of resorcinol formaldehyde resin prepolymer.

In a preferred embodiment of the invention, the phenolic resin prepolymer is a phenol formaldehyde resin prepolymer. Optionally and preferably, the treating solution also contains additives which aid in wood preservation and fire retardance.

The wood treating solution of the present invention unexpectedly exhibits extended shelf life with reduced premature gelling, faster curing time, lower curing temperatures, lower free formaldehyde content and increased tolerance to the additives which are normally added to treating solutions to aid in wood preservation and fire retardance.

Further, the inventors believe that since resorcinol has far more reactive cites than phenol, more cross linking occurs with the phenol formaldehyde/resorcinol formaldehyde resins of the present invention, than the unmodified phenol formaldehyde resins of the prior art and this additional cross linking will render the phenol formaldehyde/resorcinol formaldehyde treated wood more impervious to water and more chemically stable. The inventors believe the increased chemical stability also reduces the risk of formaldehyde emissions from the treated wood or other cellulosic products.

Further still, the inventors believe that the cross linking of the phenol formaldehyde/resorcinol formaldehyde resins of the present invention provides more bonding with the cellulose, which in turn entraps in the treated wood the water soluble additives which enhance wood preservation and fire retardance, even after the treated wood is cured. These water soluble additives can penetrate deeply into the heartwood for greater protection of the wood. In contrast, for example, the prior art copper compounds were typically not water soluble but were emulsified in water, and these large emulsified copper molecules could only impregnate the wood superficially, i.e. approximately 0.25–0.5 inches, as opposed to penetrating deep into the heartwood.

DETAILED DISCUSSION

The present invention is directed to aqueous resin solutions for treating wood and the use of such solutions to treat wood (both dried wood and green wood), and the resulting treated wood products.

In the following discussion, the term "treating solution" refers to the aqueous resin solution comprising a phenolic resin prepolymer and a resorcinol formaldehyde resin prepolymer. When wood preserving compounds (such as copper-based compounds) are added to the aqueous resin solution, the resulting compound is referred to as a wood preservative solution. When fire retarding compounds (such as diammonium phosphates) are added to the aqueous resin solution, the resulting compound is referred to as a fire retarding solution. When both wood preserving compounds and fire retarding compounds are added to the aqueous resin solution, the resulting compound is referred to as a wood preserving/fire retarding solution.

In the wood preserving and fire proofing industry, it is commonly the case that a resins manufacturer will manufacture the basic resin treating solution and provide that solution to a wood treating plant or facility which will then add the wood preserving and/or fireproofing compounds during the wood impregnation process.

For convenience, it is sometimes convenient to make the treating solution of the present invention in two steps, the first step being the preparation of water-dilutable concentrate or syrup, and the second step consisting of diluting the concentrate with water to achieve a desired concentration of active ingredients. Although any distinction between the concentrate and the aqueous treating solution, per se, is to a certain extent arbitrary, the treating solution of the present invention normally contains from 8% to 30% by weight of an aqueous phenolic resin prepolymer, 0.8% to 7% by weight resorcinol formaldehyde resin, and 64% to 91% by weight of water. By comparison, the water dilutable concentrate or syrup generally contains from 40% to 60% by weight of the phenolic resin prepolymer, 4% to 12% by weight resorcinol formaldehyde resin, and 28% to 56% by weight of water.

FORMATION OF THE AQUEOUS PHENOLIC RESIN PREPOLYMER

While the phenolic resin prepolymer component of the aqueous resin treating solution of the present invention includes other phenolic derivatives and other formaldehyde derivatives, the preferred phenolic resin prepolymer is a phenol formaldehyde resin prepolymer and is formulated beginning with the phenol in its liquid state.

Formaldehyde is added to the molten phenol in a mole ratio of approximately 1.0 to 2.75 moles per mole of phenol. Exceeding the upper limit causes excessive amounts of free formaldehyde, while going below the lower limit results in a resin solution incapable of effective cross linking. Either liquid solutions of formaldehyde or formaldehyde prills can be used with the present invention. Typically, 91% paraformaldehyde prills are added to the phenol and melted in the reaction vessel. Paraformaldehyde prills are preferred because they eliminate the need to remove excess water from the resin after it has been produced. There is little or no reaction between the molten phenol and formaldehyde until a reaction catalyst is added. The catalyst typically causes a strong exothermic reaction.

Catalysts compatible with the present invention include alkaline earth hydroxides and carbonates, including sodium hydroxide, sodium carbonate, potassium hydroxide, potassium carbonate, barium carbonate and calcium carbonate. Sodium hydroxide is the preferred reaction catalyst and is added to the reaction vessel preferably as a 50% solution in water within the range of 0.02 to 0.12 moles per mole of phenol. Exceeding the upper limit causes an excessively exothermic reaction while going below the lower limit will excessively slow the rate of reaction and cause incomplete curing. Water is added to temper the exothermic reaction.

The above components, phenol, formaldehyde, sodium hydroxide and water, are reacted between 50° C. to 100° C. for approximately 0.5 to 6 hours, preferably at about 65° C. for 2 to 4 hours, and subsequently adjusted with water to a non-volatile (or solids content) of 50% to 70%.

The phenolic resin prepolymer is a clear to amber colored water soluble liquid. Low viscosity aqueous phenolic resin prepolymers are preferred for ease of use. Such prepolymers typically have molecular weights of less than 1000.

FORMATION OF THE RESORCINOL FORMALDEHYDE RESIN PREPOLYMER

The second component of the present invention, the resorcinol formaldehyde resin prepolymer, is formulated beginning with the resorcinol.

Formaldehyde is added to the resorcinol in a mole ratio not exceeding 0.70 moles per mole of resorcinol. The mole ratio of resorcinol to formaldehyde is important in the present invention. The mole ratio is selected to ensure an excess of resorcinol in the resorcinol formaldehyde resin prepolymer. The excess of resorcinol in turn ensures that there are no aldehyde radicals present in the resorcinol formaldehyde resin prepolymer. The absence of aldehyde radicals ensures that the resorcinol formaldehyde resin prepolymer can be readily handled and can be controllably reacted with the residual formaldehyde in the aqueous phenolic resin prepolymer when the two prepolymers of the treating solution of the present invention (aqueous phenolic resin prepolymer and resorcinol formaldehyde resin prepolymer) are blended together as discussed below. Exceeding the upper limit of this mole ratio will also result in an undesirable premature solidification of the resorcinol formaldehyde resin prepolymer.

Either liquid solutions of formaldehyde or formaldehyde prills can be used with the present invention. Typically, 91% paraformaldehyde prills are added to the resorcinol and melted in the reaction vessel. Paraformaldehyde prills are preferred because they eliminate the need to remove excess water from the resin after it has been produced. There is little or no reaction catalyst between the resorcinol and formaldehyde until a reaction catalyst is added. The catalyst typically causes a strong exothermic reaction.

Catalysts compatible with the present invention include alkaline earth hydroxides and carbonates, including sodium hydroxide, sodium carbonate, potassium hydroxide, potassium carbonate, barium carbonate and calcium carbonate. Sodium hydroxide is the preferred reaction catalyst and is added to the reaction vessel within the range of 0.02% to 0.12% moles per mole of resorcinol, about 0.045 moles being preferred by weight.

Water is added to temper the exothermic reaction.

The above components, the resorcinol, formaldehyde, sodium hydroxide and water are reacted to completion at a temperature of approximately 50° C. to 100° C. for a period of from 0.5 to 6 hours, preferably at 65° C. for 2 hours and adjusted to a 50% to 75% solids content and, more preferably, to a 60% solids content. The resorcinol formaldehyde resin prepolymer of the present invention is an aqueous dark red liquid and is reactive in the presence of formaldehyde or formaldehyde donors.

FORMATION OF THE TREATING SOLUTION OF THE PRESENT INVENTION

The phenolic resin prepolymer is then blended with the resorcinol formaldehyde resin prepolymer to yield the treating solution of the present invention. More specifically, the resorcinol formaldehyde resin prepolymer is added in a ratio of 10% to 30% by weight of the phenolic resin prepolymer, preferably 16% to 20%. The two components are simply blended, and no heat is applied at this point. Exceeding the upper limit of this weight percent may result in an unstable compound, while going below the lower limit of this weight percent causes an unreactive system. Surprisingly, the treating solution of the present invention exhibits considerably longer shelf life than blends known in the art as discussed in detail below. Typically, the treating solution of the present invention will be manufactured to this point by a resins manufacturer, who will then ship the treating solution to a wood preservation plant, where the solids content of the treating solution is adjusted to 8% to 36%.

It has been found with the present invention that the addition of approximately 2 to 6 parts by weight of hexamethylene tetramine to 100 parts of the treating solution of the present invention further accelerates the gel time and cure rate, but at the expense of storage life. It is believed that at elevated temperatures, the hexamethylene tetramine decomposes to produce ammonia and formaldehyde, which also act to accelerate the reaction. It is not known why the addition of hexamethylene tetramine shortens shelf life.

IMPREGNATION OF WOOD WITH THE TREATING SOLUTION OF THE PRESENT INVENTION

In treating wood, the treating solution of the present invention will be prepared as described above, at an appropriate solids content level (i.e. the appropriate level of dilution) and the wood will be impregnated by methods known in the art, particularly the method taught by U.S. Pat. No. 3,968,276, which will typically include the following steps:

1. Wood to be treated is selected for treatment. The wood will be debarked and usually precut (e.g. dimension lumber) or pre-shaped (e.g. poles or fence posts). It may be green or air-dried or force dried and will often be in the form of poles or dimensional lumber. The ability to treat green wood (e.g. wood containing a significant amount of natural moisture) is an important advantage of the present process.
2. The wood to be treated is placed in an evacuation zone and exposed to pressures which are below atmospheric pressure (e.g. at a vacuum of at least 20 inches of mercury, preferably at least 26 inches of mercury) for a time sufficient to remove moisture and other volatiles from the wood. Vacuums of at least 28 inches of mercury are preferred. This reduced pressure is usually achieved slowly over a period of from 10 to 120 minutes (preferably 15 to 60 minutes).
3. The wood is then immersed in or flooded with the treating solution of the present invention while still under reduced pressure. During this phase of the treating, additional water and volatiles escape from the wood, and the treating solution begins to penetrate into the wood.
4. The pressure within the treating chamber or zone is then gradually increased to a level above atmospheric pressure (e.g. often to a level of 25 psig–500 psig, preferably 50 to 350 psig) to thereby increase the penetration of the wood by the treating solution. Typically, this step is continued until the treating solution has substantially completely penetrated into the heartwood, although the process could of course be stopped short of that point if a lesser treatment is desired.
5. To further improve and enhance the depth and quality of penetration of the treating solution into the wood, the vacuum and pressure cycle can be repeated as many times as desired (e.g. 2 to 25 or more cycles). When the process is cycled in this fashion, it is helpful if the maximum pressure during each cycle is increased each time by, for example, 10–100 psig above the maximum pressure of the previous cycle (usually a pressure increase of 25% to 100% over the previous pressure). This appears to prevent the rupture and collapse of the wood cells near the surface of the wood.
6. Recovering the treated wood from the treating chamber.

Note that the vacuum and pressure phases of the treating cycle should be achieved gradually to avoid destruction of the cell walls of the wood. Thus, while speed is important for commercial purposes, too rapid a change in the pressure can be harmful. Consequently, the optimum cycle rates, pressure and vacuum should be determined for each set of operating conditions to be used (e.g. size, shape and type of wood to be treated; composition of the treating compositions, temperature, etc.)

Since it is the intention of the present invention to cause or permit the treating solution to cure after it has penetrated deep within the wood, the conditions of treating should be made so as to permit easy penetration of the wood followed by a rather rapid curing of the treating solution after penetration. It has been discovered that one very convenient method of accelerating the curing of the treating solution after the treating solution has deeply penetrated into the wood is to heat the treated wood. Although this heating can be accomplished in a variety of ways, the direct application of steam to the treated wood is preferred. This method requires no special chemicals and avoids the problems of premature curing that are sometimes associated with the use of catalysts. Moreover, the use of steam is convenient, economical, environmentally acceptable and does not cause any cleanup problems. One of the advantages of the present invention is that less heat and time is required to effect curing. The amount of heat and time will vary with the cross section of wood and the type of wood being cured.

FORMATION OF WOOD PRESERVATIVE SOLUTIONS AND/OR FIRE RETARDANT SOLUTIONS

If desired, the treating solution of the present invention and the concentrates thereof may contain other ingredients such as fire retardant chemicals, dyes or colorants, catalysts, various biocides and other chemicals (e.g. borax, which serves as a buffer or stabilizer). The presence of wood preservatives such as organo-metallic compounds is optional but preferred. Compounds of zinc and copper are particularly desirable. Suitable organo/metallic compounds include zinc naphthenate, copper naphthenate and copper-8-quinolinolate. The treating solution of the present invention has been successfully tested with the addition of water soluble copper (cupric) salts such as copper gluconate and copper triethanolamine, which function to enhance the wood preservative functions of the treating solution. The treating solution of the present invention has also been successfully tested with the addition of diammonium phosphate, which acts as a fire retardant.

The treating solution of the present invention is also useful in the preservation and fire-proofing of other cellulose fiber-based products, in phenol formaldehyde resin-sized woven and non-woven products, in fiberglass thermal insulation and in pultruded products.

ADVANTAGES OF THE PRESENT INVENTION INCLUDE 1. a faster gel time (reduced 10 to 25 times at 121° C. over prior art compositions from about 9–20 minutes to instantaneous gelling in the examples discussed below), which results in faster curing times, which in turn permits more quality management by allowing full curing at the wood treating plant as opposed to the end user's location— thus eliminating the effect on curing of unpredictable variables such as seasonal effects, geographic effect, etc. at the end user's site;
2. curable at significantly lower temperatures, which in turn lowers the cost of curing;
3. longer shelf life (extended from about 3–6 weeks to about 20 weeks or more, as shown in the examples discussed below);
4. much lower "free formaldehyde" content (reduced from a range of about 0.6–3.9% to a range of about 0.1–0.2% as shown in the examples discussed below), which reduces emissions of formaldehyde during "B-staging" and curing cycles and is preferred from an environmental standpoint as free formaldehyde is an environmental hazard;
5. increased tolerance to the additives which are normally added to these resoles to aid in wood preservation (e.g. copper-based additives) and fire retardance (e.g. diammonium phosphate).

The present invention will by further understood by reference to the following Examples.

EXAMPLES 1 AND 2

FORMATION OF AQUEOUS PHENOLIC RESIN PREPOLYMERS

First, two phenol-formaldehyde resins (designated "A" and "B" respectively) were formulated as follows:

| Phenol-Formaldehyde | Ex 1 Resin A | Ex 2 Resin B |
|---|---|---|
| Phenol | 100 moles | 100 moles |
| 91% Paraformaldehyde | 130 moles | 250 moles |
| Water | 200 moles | 200 moles |
| 50% Sodium Hydroxide | 4.5 moles | 10.5 moles |

Resin A was reacted for 2 hours at 65° C. and adjusted with water to a non-volatile (or solids content) of 63%.

Resin B was reacted for 3.5 hours at 60° C. and adjusted with water to a non-volatile (or solids content) of 63%.

EXAMPLE 3

FORMATION OF AQUEOUS RESORCINOL FORMALDEHYDE RESIN PREPOLYMER

A resorcinol-formaldehyde resin prepolymer (designated hereinafter "C"), was formulated comprised of the following:

| Resorcinol-Formaldehyde | Ex 3 Resin C |
|---|---|
| Resorcinol | 100 moles |
| 91% Paraformaldehyde | 50 moles |
| Water | 210 moles |
| 50% Sodium Hydroxide | 4.5 moles |

Resin C was reacted to completion at a temperature of 85° C. and adjusted to a 75% solids content by vacuum distillation. Resin C is reactive in the presence of formaldehyde or formaldehyde donors.

EXAMPLES 4 AND 5

FORMATION OF THE TREATING SOLUTION OF THE PRESENT INVENTION

Approximately 15 parts by weight of Resin C was added each to Resins A and B, resulting in Example 4 (Resin AC) and Example 5 (Resin BC). A comparison of the properties of Resins A, B, AC and BC appears below:

| Property | Ex. 1 Resin A | Ex. 2 Resin B | Ex. 4 Resin AC | Ex. 5 Resin BC |
|---|---|---|---|---|
| Non-volatile content | 63% | 63% | 63% | 63% |
| Viscosity | 180 cps | 120 cps | 250 cps | 150 cps |
| pH | 9.0 | 9.0 | 8.8 | 8.8 |
| Sunshine Gel Time | | | | |
| @ 121° C. | 20 min. | 9 min. | 13 min. | Instantly |
| @ 107° C. | 58 min. | 28 min. | 36 min. | 1.6 min. |
| Water Tolerance | infinite | infinite | infinite | infinite |
| Free Formald. | 0.6% | 3.9% | 0.2% | 0.1% |
| Storage life [1] | 28 days | 40 days | >140 days | >90 days |

1. Storage life of the resins were measured by loss of water tolerance from infinite to less than 1000% when stored at 25° C. Resins AC and BC remained at infinite water tolerance at the last reported test date.

EXAMPLES 6 AND 7

ADDITION OF HEXAMETHYLENE TETRAMINE TO THE TREATING SOLUTION OF THE PRESENT INVENTION

A treating solution was formulated according to Examples 4 and 5. To each solution was added three parts by weight of hexamethylene tetramine, resulting in treating solutions Example 6 (Resin ACH) and Example 7 (Resin BCH). A comparison of the properties of Examples 6 and 7 appears below:

| Property | Ex. 6 Resin ACH | Ex. 7 Resin BCH |
|---|---|---|
| Non-volatile content | 63% | 20% |
| Viscosity | 230 cps | 20 cps |
| Ph | 8.8 | 8.7 |
| Sunshine Gel Time | | |
| @ 121° C. | — | — |
| @ 107° C. | 6.1 min. | — |
| Water Tolerance | infinite | infinite |
| Free Formaldehyde | 0% | 0% |
| Storage life [1] | 2 days | 17 days |

Examples 6 and 7 remained stable with the subsequent addition of water soluble copper (cupric) salts such as copper gluconate and copper triethanolamine. The addition of diammonium phosphate to Example 6 was well tolerated, but, for reasons not known, was not well tolerated by Example 7.

Example 6, containing copper triethanolamine and diammonium phosphate, when impregnated in a cellulose substrate reached a full cure in 3–4 hours at 80° C. This wood preservative solution was stable for 2 days at 20°– 25° C.

What is claimed is:

1. A treating solution suitable for treating wood and other cellulose-based materials comprising:
   (a) 8% to 30% by weight of a phenolic resin prepolymer;
   (b) 0.8% to 7% by weight of a resorcinol formaldehyde resin prepolymer; and
   (c) 64% to 91% by weight of water.

2. The treating solution of claim 1 wherein said phenolic resin prepolymer is phenol formaldehyde resin prepolymer.

3. The treating solution of claim 1 wherein said phenolic resin prepolymer is present in a ratio of 16% to 20% by weight.

4. A treating solution suitable for treating wood and other cellulose-based materials, wherein said treating solution is a water dilutable concentrate comprising:
   (a) 40% to 60% by weight of a phenolic resin prepolymer;
   (b) 4% to 12% by weight of a resorcinol formaldehyde resin prepolymer; and
   (c) 28% to 56% water.

5. The treating solution of claim 1, further comprising organo-metallic wood preserving compounds.

6. The treating solution of claim 5 wherein said organo-metallic wood preserving compounds are selected from the group comprising copper gluconate and copper triethanolamine.

7. The treating solution of claim 1 further comprising diammonium-based fire retardant compounds.

8. The treating solution of claim 7 wherein said diammonium-based fire retardant compound is diammonium phosphate.

9. A method of preparing a treating solution suitable for treating wood and other cellulose-based materials comprising:
   (a) a first step of adding phenol to a first reaction vessel;
   (b) a second step of adding formaldehyde to said first reaction vessel in a mole ratio of approximately 1.0 to 2.75 moles per mole of phenol;
   (c) a third step of adding a catalyst to said first reaction vessel in a mole ratio of 0.02 to 1.2 moles per mole of phenol, wherein said catalyst is selected from the group consisting of alkaline earth hydroxides and alkaline earth carbonates;
   (d) a fourth step of adding water to said first reaction vessel;
   (e) a fifth step of reacting the contents of said first reaction vessel for approximately 0.05 to 6 hours at a reaction temperature of 50° C. to 100° C. to form a phenolic resin prepolymer;
   (f) a sixth step of adjusting the solids content of the contents of said phenolic resin prepolymer with water to about 50% to 70%;
   (g) a seventh step of adding resorcinol to a second reaction vessel;
   (h) an eighth step of adding formaldehyde to said second reaction vessel in a mole ratio not exceeding 0.70 moles per mole of resorcinol;
   (i) a ninth step of adding a catalyst to said second reaction vessel in a mole ratio of 0.02 to 1.2 moles per mole of resorcinol, wherein said catalyst is selected from the group consisting of alkaline earth hydroxides and alkaline earth carbonates;
   (j) a tenth step of adding water to said second reaction vessel;
   (k) an eleventh step of reacting the contents of said second reaction vessel for approximately 0.5 to 6 hours at a reaction temperature of 50° C. to 100° C. to form a resorcinol formaldehyde resin prepolymer;
   (l) a twelfth step of adjusting the solids content of the contents of said resorcinol formaldehyde resin prepolymer with water to about 50% to 75%;
   (m) a thirteenth step of blending said phenolic resin prepolymer with said resorcinol formaldehyde resin prepolymer and water wherein said resorcinol formaldehyde resin prepolymer is present in a ratio of about 10% to 30% by weight of said phenolic resin prepolymer to form said treating solution.

10. The method of claim 9 further comprising the step of adjusting the solids content of said treating solution to 8% to 36%.

11. The method of claim 9 further comprising the step of adding organo-metallic wood preserving compounds.

12. The method of claim 11 wherein said organo-metallic wood preserving compounds are selected from the group comprising copper gluconate and copper triethanolamine.

13. The method of claim 9 further comprising the step of adding diammonium-based fire retardant compounds.

14. The method of claim 13 wherein said diammonium-based fire retardant compound is diammonium phosphate.

* * * * *

UNITED STATES PATENT AND TRADEMARK OFFICE
CERTIFICATE OF CORRECTION

PATENT NO. : 5,461,108
DATED : October 24, 1995
INVENTOR(S) : Jean Lewis

It is certified that error appears in the above-indentified patent and that said Letters Patent is hereby corrected as shown below:

Claim 9 Line 2 Column 12 "0.05" should read --0.5--.

Signed and Sealed this

Thirtieth Day of January, 1996

Attest:

BRUCE LEHMAN

Attesting Officer       Commissioner of Patents and Trademarks